US010146325B2

(12) United States Patent
Goo

(10) Patent No.: US 10,146,325 B2
(45) Date of Patent: Dec. 4, 2018

(54) APPARATUS AND METHOD FOR ARRANGING A KEYPAD IN WIRELESS TERMINAL

(71) Applicant: Samsung Electronics Co., Ltd., Gyeonggi-do (KR)

(72) Inventor: Ja-Min Goo, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 228 days.

(21) Appl. No.: 13/669,582

(22) Filed: Nov. 6, 2012

(65) Prior Publication Data
US 2013/0135210 A1 May 30, 2013

(30) Foreign Application Priority Data
Nov. 25, 2011 (KR) .................. 10-2011-0123964

(51) Int. Cl.
G06F 3/02 (2006.01)
G06F 3/0488 (2013.01)

(52) U.S. Cl.
CPC ........ G06F 3/0216 (2013.01); G06F 3/04886 (2013.01)

(58) Field of Classification Search
CPC .... G06F 3/04886; G06F 21/83; G06F 3/0216; G06F 1/1666
USPC ......................... 345/168–169, 173
See application file for complete search history.

(56) References Cited

U.S. PATENT DOCUMENTS

| 7,008,127 | B1 * | 3/2006 | Kurriss | G06F 3/0219 400/414 |
| 7,104,711 | B2 * | 9/2006 | Kurriss | G06F 3/0219 400/414 |
| 2007/0009303 | A1 * | 1/2007 | Kurriss | G06F 3/0238 400/486 |
| 2009/0058815 | A1 * | 3/2009 | Jeon et al. | 345/169 |
| 2010/0001968 | A1 | 1/2010 | Lee | |
| 2010/0097321 | A1 | 4/2010 | Son et al. | |

(Continued)

FOREIGN PATENT DOCUMENTS

CN  102177485 A  9/2011
JP  10-49305 A  2/1998

(Continued)

OTHER PUBLICATIONS

Um, Tae Won; "Display Mode Switching Device and Method for Mobile Terminal"; U.S. Appl. No. 14/946,331, filed Nov. 19, 2015.

(Continued)

Primary Examiner — Rodney Amadiz
(74) Attorney, Agent, or Firm — Cha & Reiter, LLC

(57) ABSTRACT

An apparatus and method for arranging a keypad in a wireless terminal, and more particularly, to an apparatus and method for arranging a keypad in a wireless terminal to conveniently perform a key input in the wireless terminal, the apparatus including: a display unit for displaying the keypad in at least one of a right and left side on a screen of the display unit in a horizontal mode of the wireless terminal; and a controller for controlling the display unit to display the keypad in the right and/or left side on the screen of the display unit in the horizontal mode of the wireless terminal.

22 Claims, 3 Drawing Sheets

(56) References Cited

U.S. PATENT DOCUMENTS

| | | |
|---|---|---|
| 2010/0241985 A1 | 9/2010 | Kim et al. |
| 2010/0277414 A1* | 11/2010 | Tartz et al. .................. 345/169 |
| 2011/0141027 A1 | 6/2011 | Ghassabian |
| 2011/0242138 A1 | 10/2011 | Tribble |
| 2011/0285631 A1* | 11/2011 | Imamura .............. G06F 1/1616 345/168 |
| 2012/0084699 A1* | 4/2012 | Sirpal .................. G06F 1/1616 715/773 |
| 2012/0113126 A1* | 5/2012 | Koch et al. ................... 345/473 |
| 2012/0127069 A1* | 5/2012 | Santhiveeran ........ G06F 1/1686 345/156 |
| 2012/0206363 A1* | 8/2012 | Kyprianou .......... G06F 3/04883 345/168 |
| 2012/0324381 A1* | 12/2012 | Cohen et al. .................. 715/765 |
| 2013/0002565 A1* | 1/2013 | Tumanov .............. G06F 1/1626 345/173 |
| 2013/0057475 A1* | 3/2013 | Duggan et al. ............... 345/168 |
| 2013/0093680 A1* | 4/2013 | Ogita ............................ 345/168 |
| 2013/0093682 A1* | 4/2013 | Lindsay .............. G06F 3/04886 345/169 |
| 2013/0120276 A1 | 5/2013 | Kim et al. |
| 2013/0321281 A1* | 12/2013 | Lambie ................. G06F 3/0219 345/169 |
| 2015/0148107 A1 | 5/2015 | Yamazaki |

FOREIGN PATENT DOCUMENTS

| | | | |
|---|---|---|---|
| JP | 2002-354085 A | 12/2002 | |
| JP | 2009-159600 A | 7/2009 | |
| KR | 10-2009-0024343 A | 3/2009 | |
| KR | 10-2009-0063903 A | 6/2009 | |
| KR | 10-2010-0003621 A | 1/2010 | |
| KR | 10-2010-0003850 A | 1/2010 | |
| KR | 1020100003621 A * | 1/2010 | ............ G06F 3/041 |
| KR | 10-2010-0042976 A | 4/2010 | |
| KR | 10-2011-0051645 A | 5/2011 | |
| KR | 10-1051068 B1 | 7/2011 | |
| KR | 10-2011-0088486 A | 8/2011 | |
| KR | 10-2011-0097373 A | 8/2011 | |
| KR | 10-2011-0120670 A | 11/2011 | |
| KR | 10-1111566 B1 | 2/2012 | |
| KR | 10-1175348 B1 | 8/2012 | |
| KR | 10-1545569 B1 | 8/2015 | |

OTHER PUBLICATIONS

Japanese Search Report dated Nov. 22, 2016.
Chinese Search Report dated Oct. 8, 2016.

* cited by examiner

FIG.3A

|   | A | B | a | C | D |
|---|---|---|---|---|---|
| | 1 | 2 | | 3 | back space |
| | 4 | 5 | | 6 | enter |
| | 7 | 8 | ← | •9 | Kor/Eng |
| | Symbol | 0 | | Space | Setting |

FIG.3B

|   | A | B | C | a | D |
|---|---|---|---|---|---|
| | 1 | 2 | 3 | | back space |
| | 4 | 5 | 6• | → | enter |
| | 7 | 8• | 9 | → | Kor/Eng |
| | Symbol | 0 | Space | | Setting |

FIG.3C

|   | A | a | B | C | D |
|---|---|---|---|---|---|
| | 1 | | 2 | 3 | back space |
| | 4 | | 5← | →6 | enter |
| | 7 | | 8 | 9 | Kor/Eng |
| | Symbol | | 0 | Space | Setting |

FIG.3D

|   | A | a | C | B | D |
|---|---|---|---|---|---|
| | 1 | | 3 | 2 | back space |
| | 4 | | 6 | 5 | enter |
| | 7 | | 9 | 8 | Kor/Eng |
| | Symbol | | Space | 0 | Setting |

APPARATUS AND METHOD FOR ARRANGING A KEYPAD IN WIRELESS TERMINAL

CLAIM OF PRIORITY

This application claims priority under 35 U.S.C. § 119(a) to a Korean Patent Application filed in the Korean Intellectual Property Office on Nov. 25, 2011 and assigned Serial No. 10-2011-0123964, the entire contents of which are incorporated herein by reference.

BACKGROUND OF THE INVENTION

1. Field of the Invention

The present invention relates generally to an apparatus and method for arranging a keypad in a wireless terminal, and more particularly, to an apparatus and method for arranging a keypad in a wireless terminal to conveniently perform a key input in the wireless terminal.

2. Description of the Related Art

When an input mode is performed in a vertical mode (in which a wireless terminal is placed in a vertical direction), a keypad is displayed on the bottom of a screen of a display unit, and a key input in the input mode is performed on the displayed keypad.

Even when the input mode is performed in a horizontal mode (in which the wireless terminal is placed in a horizontal direction), a keypad is displayed on the bottom of the screen of the display unit, and a key input in the input mode is performed on the displayed keypad.

In the vertical mode of the wireless terminal, because the wireless terminal is placed in the vertical direction, a significant amount of screen area is available above the displayed keypad in order to display input contents together with the displayed keypad.

However, in the horizontal mode of the wireless terminal, because the wireless terminal is placed in the horizontal direction, the keypad in the horizontal mode occupies a relatively larger portion of the screen than when the keypad is in the vertical mode. Therefore, all of input contents may not be displayed on the screen. Additionally, it is inconvenient to use keys arranged in the center of the keypad in the horizontal mode.

SUMMARY OF THE INVENTION

The present invention provides an apparatus and method for arranging a keypad in a wireless terminal so as to allow a user to conveniently perform a key input in the wireless terminal.

In accordance with one aspect of the present invention, an apparatus and method is provided for arranging a keypad in a wireless terminal to conveniently perform a key input while the wireless terminal is in a horizontal mode of operation.

In accordance with another aspect of the present invention, an apparatus and method is provided for arranging a keypad in a wireless terminal so as to allow display of all of input contents on a screen of a display unit in a horizontal mode of the wireless terminal.

According to one aspect of the present invention, there is provided an apparatus for arranging a keypad in a wireless terminal, including: a display unit for displaying the keypad in at least one of a right and left side on a screen of the display unit in a horizontal mode of the wireless terminal; and a controller for controlling the display unit to display the keypad in at least one of the right and left side on the screen of the display unit in the horizontal mode of the wireless terminal.

According to another aspect of the present invention, there is provided a method of arranging a keypad in a wireless terminal, including: switching to a horizontal mode of the wireless terminal; and displaying the keypad in at least one of a right and left side on a screen of a display unit in the horizontal mode of the wireless terminal.

When, in accordance with the invention, the keypad of the wireless terminal in the horizontal mode is displayed in at least one of the right and left side on the screen, a user may conveniently perform a key input, while at the same time a vertical area of the screen that is adjacent to the displayed keypad has no keypad display thereon. Thus, the full vertical area of the adjacent portion of the screen is available to display input contents thereon.

BRIEF DESCRIPTION OF THE DRAWINGS

The above and other features and advantages of the present invention will become more apparent from the following detailed description when taken in conjunction with the accompanying drawing in which:

FIGS. 3A to 3D illustrate keypads of the wireless terminal, according to an embodiment of the present invention.

DETAILED DESCRIPTION OF THE INVENTION

Preferred embodiments of the present invention will be described herein below with reference to the accompanying drawings. Like reference numbers are used to refer to like elements throughout the specification and the drawings. Detailed descriptions of functions and structures incorporated herein that are well known by those of ordinary skill in the art may be omitted for clarity and simplicity so as to not obscure appreciation of the present invention.

Figure 1:
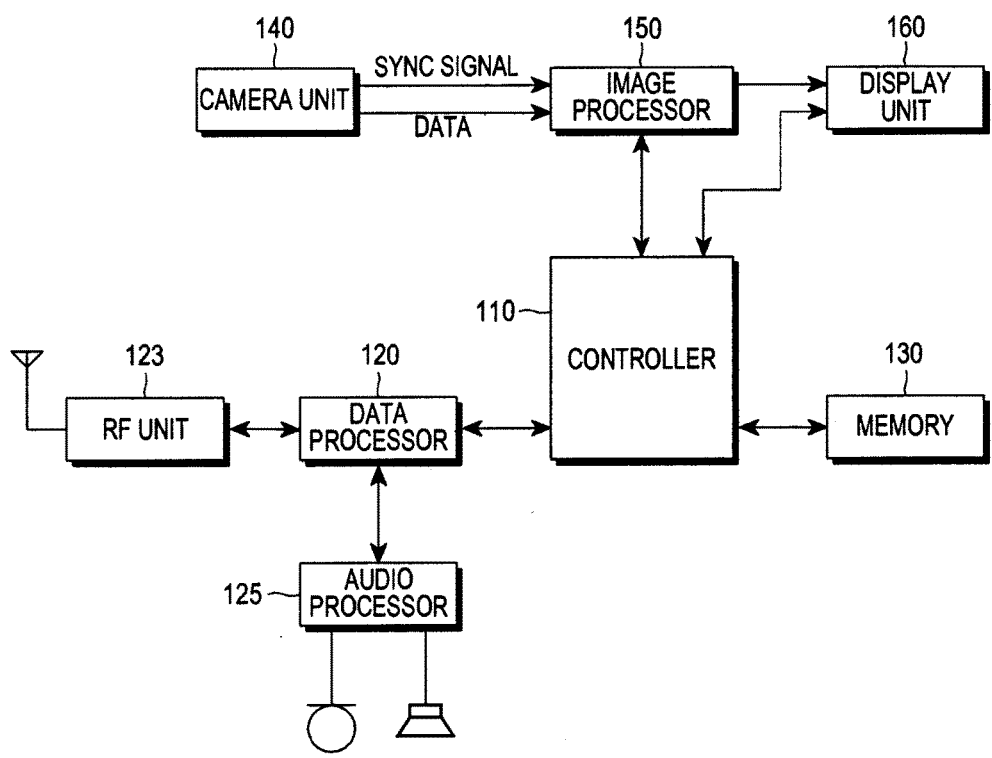
FIG. 1 is a block diagram illustrating a wireless terminal according to an embodiment of the present invention.

Referring to FIG. 1, a Radio Frequency (RF) unit 123 performs a wireless communication function of the wireless terminal. The RF unit 123 includes an RF transmitter for up-converting a frequency of a transmission signal and amplifying the up-converted transmission signal and an RF receiver for low-noise amplifying a received signal and down-converting a frequency of the amplified received signal. A data processor 120 includes a transmitter for coding and modulating the transmission signal and a receiver for demodulating and decoding the received signal. In other words, the data processor 120 may include a modem and a codec. The codec includes a data codec for processing packet data and the like, and an audio codec for processing an audio signal such as voice. An audio processor 125 plays a received audio signal output from the audio codec in the data processor 120 and transfers a transmission audio signal picked up by a microphone to the audio codec in the data processor 120.

A memory 130 may include a program memory and a data memory. The program memory may store programs for controlling a general operation of the wireless terminal. In addition, the program memory may store programs for controlling a display unit 160 to display a keypad in a right and/or left side on a screen in a horizontal mode of the wireless terminal. The data memory may temporarily store data generated while the programs are executed. In addition, when the horizontal mode of operation of the wireless terminal ends, according to an embodiment of the present invention (that is, when the display unit 160 is oriented in the horizontal direction), the memory 130 may store the keypad in the right and/or left side on the screen in the horizontal mode.

A controller 110 controls the overall operation of the wireless terminal.

According to an embodiment of the present invention, during the horizontal mode of the wireless terminal, the controller 110 controls the display unit 160 to display a keypad in the right and/or left side on the screen of the display unit 160.

In addition, when it is determined that the wireless terminal switches to an input mode in the horizontal mode, the controller 110 may control the display unit 160 to display a keypad in the right and/or left side on the screen of the display unit 160.

In addition, when the wireless terminal switches to the horizontal mode, the controller 110 may control the display unit 160 to display a keypad arranged in the right and/or left side on the screen of the display unit 160 in accordance with a previous horizontal mode.

When, as noted above, the wireless terminal is in the horizontal mode (that is, the screen is oriented in the horizontal direction) and the keypad is displayed in a right and/or left side on the screen, a user may conveniently perform a key input, while at the same time a vertical area of the screen that is adjacent to the displayed keypad has no keypad display thereon. Thus, the full vertical area of the adjacent portion of the screen is available to display input contents thereon.

In addition, in accordance with another aspect of the invention, a user is able to control details of how a keypad is arranged in the right and/or left side on the screen of the display unit 160, as described below.

More specifically, the controller 110 may control the display unit 160 to display a keypad divided and arranged on a row basis in the right and/or left side on the screen of the display unit 160 by moving row-based keys in accordance with a dragged direction through a hold-and-drag operation performed by a user of the wireless terminal.

In addition, when the hold-and-drag operation occurs for predetermined row-based keys of a keypad arranged in the left side on the screen of the display unit 160 in the horizontal mode of the wireless terminal, the controller 110 may control the display unit 160 to display the predetermined held row-based keys in the right side on the screen of the display unit 160 by moving the predetermined held row-based keys to the right (the dragged direction). In this case, the controller 110 may control the display unit 160 to display the predetermined held row-based keys in the right side on the screen of the display unit 160 when the drag operation in the right direction passes over the center line on the screen.

In addition, when the hold-and-drag operation occurs for predetermined row-based keys of a keypad arranged in the left side on the screen of the display unit 160 in the horizontal mode of the wireless terminal, the controller 110 may control the display unit 160 to display the predetermined held row-based keys at a changed position of the keypad arranged in the left side on the screen of the display unit 160 by moving the predetermined held row-based keys to the left (the dragged direction).

In addition, when the hold-and-drag operation occurs for predetermined row-based keys of a keypad arranged in the right side on the screen of the display unit 160 in the horizontal mode of the wireless terminal, the controller 110 may control the display unit 160 to display the predetermined held row-based keys in the left side on the screen of the display unit 160 by moving the predetermined held row-based keys to the left (the dragged direction). In this case, the controller 110 may control the display unit 160 to display the predetermined held row-based keys in the left side on the screen of the display unit 160 when the drag operation in the left direction passes over the center line on the screen.

In addition, when the hold-and-drag operation occurs for predetermined row-based keys of a keypad arranged in the right side on the screen of the display unit 160 in the horizontal mode of the wireless terminal, the controller 110 may control the display unit 160 to display the predetermined held row-based keys at a changed position of the keypad arranged in the right side on the screen of the display unit 160 by moving the predetermined held row-based keys to the right (the dragged direction).

A camera unit 140 includes a camera sensor for optically capturing image data and converting the optically captured image data into an electrical image signal, and a signal processor for converting the electrical image signal into digital data. The camera sensor is assumed herein to be a Charge-Coupled Device (CCD) or Complementary Metal Oxide Semiconductor (CMOS) sensor, and the signal processor may be realized by a Digital Signal Processor (DSP). The camera sensor and the signal processor may be realized in an integrated manner or in a separated manner.

An image processor 150 performs Image Signal Processing (ISP) for displaying image signals output from the camera unit 140 on the display unit 160, and the ISP performs functions such as gamma correction, interpolation, spatial variation, image effects, image scaling, Automatic White Balance (AWB), Automatic Exposure (AE), and Automatic Focusing (AF). The image processor 150 processes the image signals output from the camera unit 140 on a frame basis, and outputs the frame-based image data according to the characteristics and size of the display unit 160. The image processor 150, which includes a video codec, compresses frame image data displayed on the display unit 160 by preset coding, and restores (or decompresses) the compressed frame image data into its original frame image data. The video codec may include a JPEG codec, MPEG4 codec, Wavelet codec, etc. Assuming that the image processor 150 includes an On-Screen Display (OSD) function, the controller 110 may control the image processor 150 to output OSD data according to the size of a screen on which the data is displayed.

The display unit 160 displays an image output from the image processor 150 and user data output from the controller 110 on a screen. The display unit 160 may function as an input unit by being realized as a touch screen. In this case, the display unit 160 functioning as the input unit may display a keypad including the alphanumeric keys for inputting alphanumeric information and function keys for setting various functions.

In addition, according to an embodiment of the present invention, the display unit 160 may display a keypad in the right and/or left side on a screen in the horizontal mode of the wireless terminal, and the keypad may be divided on a row basis. In this case, keys arranged in row-based keypads of the keypad may be displayed the same as keys arranged in row-based keypads of a keypad displayed in a vertical mode of the wireless terminal.

Figure 2:
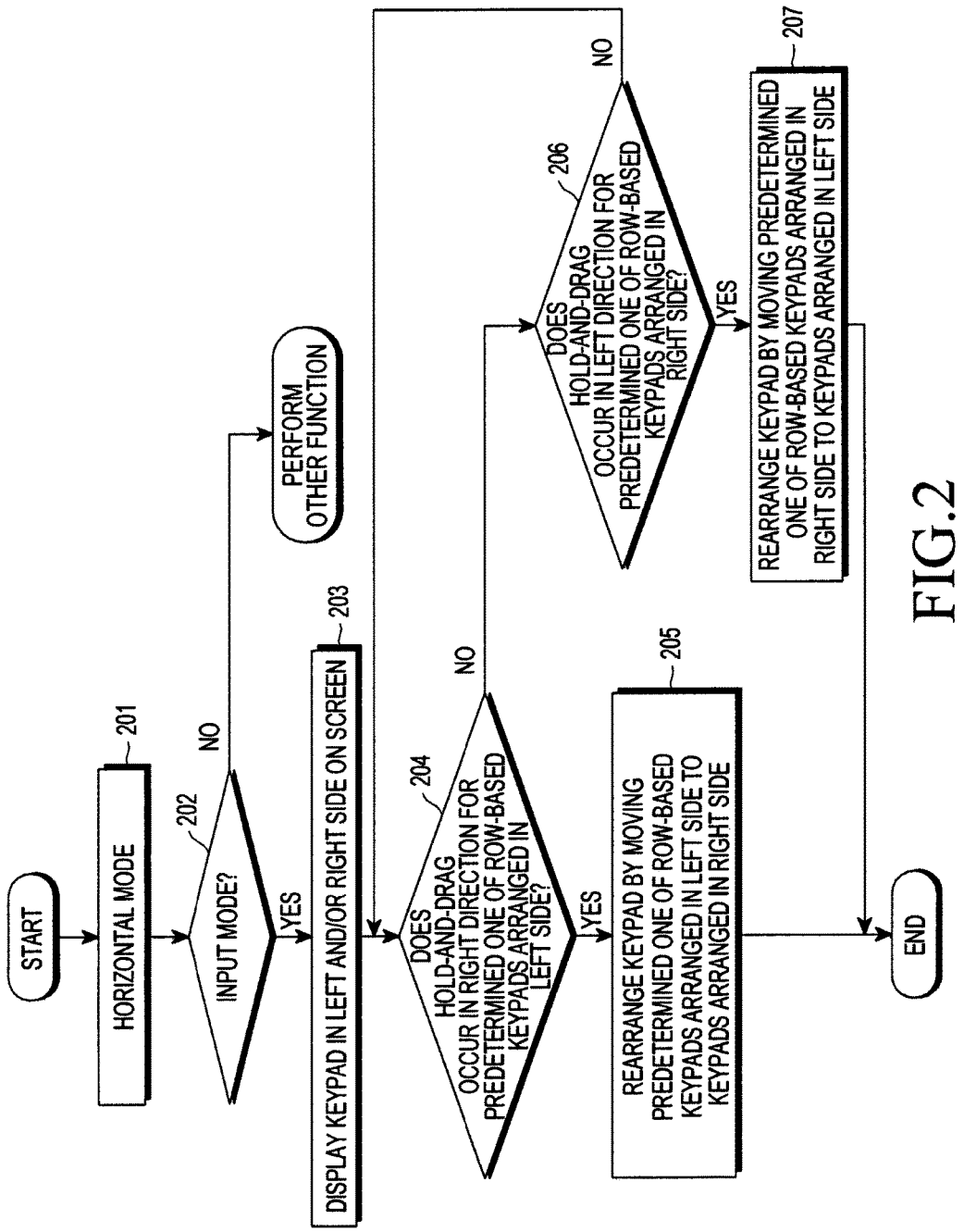
FIG. 2 is a flowchart illustrating a process of arranging a keypad in the wireless terminal, according to an embodiment of the present invention.

FIG. 2 is a flowchart illustrating a process of arranging a keypad in a wireless terminal, according to an embodiment of the present invention, and FIGS. 3A to 3D illustrate keypads of the wireless terminal according to an embodiment of the present invention.

Referring to FIG. 2 (and with reference to FIG. 1 for details of the apparatus), in step 201, i.e., in the horizontal mode, in which the wireless terminal is placed in the horizontal direction, if the wireless terminal switches to the input mode for performing an input operation, the controller 110 detects this in step 202 and proceeds to step 203 to display a keypad in the left and/or right side on the screen of the display unit 160.

Alternatively, when it is determined in the input mode of the wireless terminal that the wireless terminal has been switched to the horizontal mode, the controller 110 may control the display unit 160 to display a keypad in the left and/or right side on the screen of the display unit 160 in step 203.

Alternatively, in step 203, the controller 110 may control the display unit 160 to display a keypad set as default or a keypad arranged in the left and/or right side on the screen of the display unit 160 in accordance with a previous horizontal mode.

Thus, when the wireless terminal switches to the horizontal mode, the controller 110 may control the display unit 160 to display a keypad in each of the left and right sides on the screen of the display unit 160, in only the left side on the screen of the display unit 160, or in only the right side on the screen of the display unit 160.

The keypad displayed in the left and/or right side on the screen of the display unit 160 may be divided on a row basis, and keys arranged in row-based keypads of the keypad may be displayed the same as keys arranged in row-based keypads of a keypad displayed in the vertical mode of the wireless terminal.

While the keypad is displayed in the left and/or right side on the screen of the display unit 160 in step 203, if a hold-and-drag operation occurs in the right direction for a predetermined one of row-based keypads arranged in the left side on the screen, the controller 110 detects this in step 204 and proceeds to step 205 to rearrange the keypad by moving the predetermined held row-based keypad to row-based keypads arranged in the right side on the screen of the display unit 160.

In this case, if the drag operation ends after the predetermined held row-based keypad passes over the center of the screen, the controller 110 controls the display unit 160 to rearrange the keypad by moving the predetermined held row-based keypad to the leftmost position of the row-based keypads arranged in the right side on the screen of the display unit 160.

If the drag operation ends when the predetermined held row-based keypad is placed at a predetermined one of the row-based keypads arranged in the right side on the screen, the controller 110 controls the display unit 160 to rearrange the keypad by moving the predetermined held row-based keypad to a position prior or next to the predetermined one of the row-based keypads arranged in the right side on the screen at which the drag operation ended.

Otherwise, while the keypad is displayed in the left and/or right side on the screen of the display unit 160 in step 203, if a hold-and-drag operation occurs in the left direction for a predetermined one of the row-based keypads arranged in the left side on the screen, the controller 110 detects this and controls the display unit 160 to rearrange the keypad by moving the predetermined held row-based keypad to the left so that a position of the predetermined held row-based keypad is changed in the row-based keypads arranged in the left side on the screen of the display unit 160.

In this case, if the drag operation ends when the predetermined held row-based keypad is placed at a predetermined one of the row-based keypads arranged in the left side on the screen, the controller 110 controls the display unit 160 to rearrange the keypad by moving the predetermined held row-based keypad to a position prior or next to the predetermined one of the row-based keypads arranged in the left side on the screen at which the drag operation ended.

Otherwise, while the keypad is displayed in the left and/or right side on the screen of the display unit 160 in step 203, if a hold-and-drag operation occurs in the left direction for a predetermined one of the row-based keypads arranged in the right side on the screen, the controller 110 detects this in step 206 and proceeds to step 207 to rearrange the keypad by moving the predetermined held row-based keypad to the row-based keypads arranged in the left side on the screen of the display unit 160.

In this case, if the drag operation ends after the predetermined held row-based keypad passes over the center of the screen, the controller 110 controls the display unit 160 to rearrange the keypad by moving the predetermined held row-based keypad to the rightmost position of the row-based keypads arranged in the left side on the screen of the display unit 160.

If the drag operation ends when the predetermined held row-based keypad is placed at a predetermined one of the row-based keypads arranged in the left side on the screen, the controller 110 controls the display unit 160 to rearrange the keypad by moving the predetermined held row-based keypad to a position prior or next to the predetermined one of the row-based keypads arranged in the left side on the screen at which the drag operation ends.

Otherwise, while the keypad is displayed in the left and/or right side on the screen of the display unit 160 in step 203, if a hold-and-drag operation occurs in the right direction for a predetermined one of the row-based keypads arranged in the right side on the screen, the controller 110 detects this and controls the display unit 160 to rearrange the keypad by moving the predetermined held row-based keypad to the right so that a position of the predetermined held row-based keypad is changed in the row-based keypads arranged in the right side on the screen of the display unit 160.

In this case, if the drag operation ends when the predetermined held row-based keypad is placed at a predetermined one of the row-based keypads arranged in the right side on the screen, the controller 110 controls the display unit 160 to rearrange the keypad by moving the predetermined held row-based keypad to a position prior or next to the predetermined one of the row-based keypads arranged in the right side on the screen at which the drag operation ends.

FIG. 3A illustrates row-based keypads A and B arranged in the left side on the screen of the display unit 160 and row-based keypads C and D arranged in the right side on the screen in the horizontal mode of the wireless terminal.

In FIG. 3A, when a hold-and-drag operation occurs in the left direction for a predetermined one (C) of the row-based keypads C and D arranged in the right side on the screen, if the drag operation in the left direction ends right after the predetermined held row-based keypad C passes over the center line a of the screen, the predetermined held one (C) of the row-based keypads C and D arranged in the right side on the screen is moved and rearranged to the rightmost position of the row-based keypads A and B arranged in the left side on the screen as shown in FIG. 3B.

In FIG. 3B, when a hold-and-drag operation occurs in the right direction for a predetermined one (C) of the row-based keypads A, B, and C arranged in the left side on the screen, if the drag operation in the right direction ends right after the predetermined held row-based keypad C passes over the center line a of the screen, and thereafter, when another hold-and-drag operation occurs in the right direction for a predetermined one (B) of the row-based keypads A and B arranged in the left side on the screen, if the drag operation in the right direction ends right after the predetermined held row-based keypad B passes over the center line a of the screen, the predetermined held ones (C and B) of the row-based keypads A, B, and C arranged in the left side on the screen are moved and rearranged in the moved order to the leftmost position of the row-based keypad D arranged in the right side on the screen as shown in FIG. 3C.

In FIG. 3C, when a hold-and-drag operation occurs in the right direction for a predetermined one (B) of the row-based keypads B, C, and D arranged in the right side on the screen, if the drag operation ends when the predetermined held row-based keypad B is placed at a predetermined one (C) of the row-based keypads B, C, and D arranged in the right side on the screen, the predetermined held one (B) of the row-based keypads B, C, and D arranged in the right side on the screen is moved and rearranged to a position next to the predetermined one (C) at which the drag operation ends.

As described above, when an input operation is performed by using a keypad arranged in the left and/or right side on a screen of a display unit in the horizontal mode of a wireless terminal, all of input contents may be perceived on a central vertical portion of the screen that has no keypad display thereon, which portion of the screen has about the same height as the display portion of the screen in the vertical mode of the wireless terminal when a keypad is displayed at the bottom of the screen.

In addition, although only movement of row-based keypads of a keypad has been described in the embodiments of the present invention, movement of column-based keypads of the keypad may also be likely performed through a hold-and-drag operation.

In addition, although only row-based movement of a keypad has been described in the embodiments of the present invention, an individual character/number assigned to each key of the keypad may also be moved and rearranged to a desired key position of the keypad through a hold-and-drag operation.

As is apparent from the foregoing description, the proposed apparatus and method for arranging a keypad in a wireless terminal, in which a keypad is displayed in a right and/or left side on a screen of a display unit in the horizontal mode of the wireless terminal, allows a user to conveniently perform a key input in the horizontal mode of the wireless terminal, while at the same time leaving a vertical area of the screen that is adjacent to the displayed keypad, which vertical area has no keypad display thereon, so that the full vertical area of the screen is available to display input contents thereon.

While the invention has been shown and described with reference to certain exemplary embodiments, such as a wireless terminal, thereof, it will be understood by those skilled in the art that various changes in form and details may be made therein without departing from the spirit and scope of the invention as defined by the appended claims and their equivalents.

What is claimed is:

1. A wireless terminal comprising:
    a touch screen display;
    a controller configured to control the touch screen display to display in an input state a touch keypad in a vertical input mode or a horizontal input mode, the keypad including a plurality of keys; and
    a memory coupled to the controller and having stored therein plural configuration states of the keypad including a bottom configuration state in which the keypad is displayed along a bottom edge of the touch screen display, and a split configuration state in which the keypad is split to be displayed along two opposing edges of the touch screen display,
    wherein the controller is further configured to:
    in response to detecting only that the wireless terminal is placed in the horizontal input mode from the vertical input mode, change the display of the plurality of keys of the keypad to the split configuration state in which the two opposing edges include a left side and a right side of the touch screen display with no keys displayed in an area between split portions of the keypad in the horizontal input mode, and
    when the wireless terminal is adjusted from the horizontal input mode with the split configuration state to the vertical input mode, control the touch screen display to remove the split configuration state from display and revert to the bottom configuration state.

2. The wireless terminal of claim 1, wherein in the split configuration state, in response to a user request to change a position of a selected individual key from a first portion displayed along the right side to a second portion displayed along the left side of the touch screen display, change a display of the position of the selected individual key from the first portion displayed along the right side of the touch screen display to the second portion displayed along the left side of the touch screen display, and
    in response to a user request to change a position of a selected individual key from the second portion displayed along the left side to the first portion displayed along the right side of the touch screen display, change a display of the position of the selected individual key from the second portion displayed along the left side of the touch screen display to the first portion displayed along the right side of the touch screen display.

3. The wireless terminal of claim 2, wherein the controller controls the memory to store a change of the position of the selected individual key in the split configuration state.

4. The wireless terminal of claim 2, wherein the controller controls a storage of a plurality of split configuration states of the keypad and respective applications associated with the split configuration states of the keypad.

5. The wireless terminal of claim 2, wherein the controller is configured to change display of an arrangement of the keypad in the bottom configuration state to the left side or to the right side of the touch screen display according to a user selection.

6. A wireless terminal comprising:
    a touch screen display for displaying in an input state a touch keypad, the keypad including a plurality of keys;
    a memory for storing one or more of configuration states of the keypad including a split configuration state; and
    a controller configured to:
    when the wireless terminal is placed in a vertical mode, displaying the plurality of keys in a bottom configuration state in which the keypad is displayed along a bottom edge of the touch screen display, and in response to detecting only the wireless terminal placed in a horizontal mode from the vertical mode, control the touch screen display to change the display of the keypad from the bottom configuration state to the split configuration state in which the plurality of keys are arranged along a left side and a right side of the touch screen display.

7. The wireless terminal of claim 6, wherein in the split configuration state, in response to a user request to change a position of a selected individual key from a first portion displayed along the right side to a second portion displayed along the left side of the touch screen display, change a display of the position of the selected individual key from the first portion displayed along the right side of the touch screen display to the second portion displayed along the left side of the touch screen display, and in response to a user request to change a position of a selected individual key from the second portion displayed along the left side to the first portion displayed along the right side of the touch screen display, change a display of the position of the selected individual key from the second portion displayed along the left side of the touch screen display to the first portion displayed along the right side of the touch screen display.

8. The wireless terminal of claim 7, wherein the controller controls the memory to store the change of the position of the selected individual key in the split configuration state.

9. The wireless terminal of claim 7, wherein the controller controls storage of a plurality of split configuration states of the keypad and respective applications associated with a particular split configuration state of the keypad.

10. The wireless terminal of claim 7, wherein the controller is configured to change display of an arrangement of the keypad in the bottom configuration state to the left side or to the right side of the touch screen display according to a user selection.

11. A method of arranging a keypad in a wireless terminal, comprising:
    displaying in an input state of a touch screen display a touch keypad in a vertical input mode or a horizontal input mode, the keypad including a plurality of keys;
    providing a memory having plural configuration states of the keypad associated with the horizontal input mode stored thereon that includes a split configuration state in which the keypad is split to be displayed along two opposing edges of the touch screen display and a bottom configuration state in which the keypad is displayed along a bottom edge of the touch screen display; and
    in response to detecting only that the wireless terminal is placed in a horizontal input mode from the vertical input mode controlling by a controller the touch screen display to change display of the plurality of keys from the bottom configuration state to the split configuration state in which the keypad is split into separate first and second portions disposed along a left side and a right side of the touch screen display with no keys displayed in an area between the first portion and the second portion.

12. The method of claim 11, wherein in the split configuration state, in response to a user request to change a position of a selected individual key from a first portion displayed along the right side to a second portion displayed along the left side of the touch screen display, changing a display of the position of the selected individual key from the first portion displayed along the right side of the touch screen display to the second portion displayed along the left side of the touch screen display, and in response to a user request to change a position of a selected individual key from the second portion displayed along the left side to the first portion displayed along the right side of the touch screen display, changing a display of the position of the selected individual key from the second portion displayed along the left side of the touch screen display to the first portion displayed along the right side of the touch screen display.

13. The method of claim 12, further comprising storing the change of the position of the selected individual key in the split configuration state.

14. The method of claim 12, further comprising storing a plurality of split configuration states of the keypad and respective applications associated with a particular split configuration state of the keypad.

15. The method of claim 12, further comprising changing display of an arrangement of the keypad in the bottom configuration state to the left side or to the right side of the touch screen display according to a user selection.

16. A method of arranging a keypad in a wireless terminal, comprising:
    displaying in an input state of a touch screen display a touch keypad, the keypad including a plurality of keys;
    providing a memory having plural configuration states of the keypad stored thereon that includes a split configuration state in which the keypad is split to be displayed along two opposing edges of the touch screen display and a bottom configuration state in which the keypad is displayed along a single edge of the touch screen display;
    when the wireless terminal is placed in a vertical mode, controlling by a processor the touch screen display to display the keypad in the bottom configuration state; and
    in response to detecting only placement of wireless terminal from the vertical mode to a horizontal mode while the keypad is displayed in the bottom configuration state, changing display of the plurality of keys of the keypad from the bottom configuration state into the split configuration state in which the keypad is split into separate first and second portions disposed along a left side and a right side of the touch screen display with no keys displayed in an area between the first portion and the second portion.

17. The method of claim 16, wherein in the split configuration state, in response to a user request to change a position of a selected individual key from a first portion displayed along the right side to a second portion displayed along the left side of the touch screen display, changing a display of the position of the selected individual key from the first portion displayed along the right side of the touch screen display to the second portion displayed along the left side of the touch screen display, and in response to a user request to change a position of a selected individual key from the second portion displayed along the left side to the first portion displayed along the right side of the touch screen display, changing a display of the position of the selected individual key from the second portion displayed along the left side of the touch screen display to the first portion displayed along the right side of the touch screen display.

18. The method of claim 17, further comprising storing the change of the position of the selected individual key in the split configuration state.

19. The method of claim 17, further comprising storing a plurality of split configuration states of the keypad and respective applications associated with a particular split configuration state of the keypad.

20. The method of claim 17, further comprising changing display of an arrangement of the keypad in the bottom configuration state to the left side or to the right side of the touch screen display according to a user selection.

21. A wireless terminal comprising:
a touch screen display;
a controller configured to control the touch screen display to display in an input state a touch keypad in a vertical input mode or a horizontal input mode, the keypad including a plurality of keys; and
a memory coupled to the controller and having stored therein plural configuration states of the keypad including a bottom configuration state in which the keypad is displayed along a bottom edge of the touch screen display, and a split configuration state in which the keypad is split to be displayed along two opposing edges of the touch screen display,
wherein the controller is further configured to:
in response to detecting the wireless terminal is placed in the horizontal input mode from the vertical input mode without additional detection, change the display of the plurality of keys of the keypad to the split configuration state in which the two opposing edges include a left side and a right side of the touch screen display with no keys displayed in an area between split portions of the keypad in the horizontal input mode, and
when the wireless terminal is adjusted from the horizontal input mode with the split configuration state to the vertical input mode, control the touch screen display to remove the split configuration state from display and revert to the bottom configuration state.

22. A method of arranging a keypad in a wireless terminal, comprising: displaying in an input state of a touch screen display a touch keypad in a vertical input mode or a horizontal input mode, the keypad including a plurality of keys;
providing a memory having plural configuration states of the keypad associated with the horizontal input mode stored thereon that includes a split configuration state in which the keypad is split to be displayed along two opposing edges of the touch screen display and a bottom configuration state in which the keypad is displayed along a bottom edge of the touch screen display; and
in response to detecting the wireless terminal is placed in a horizontal input mode from the vertical input mode without additional detection controlling by a controller the touch screen display to change display of the plurality of keys from the bottom configuration state to the split configuration state in which the keypad is split into separate first and second portions disposed along a left side and a right side of the touch screen display with no keys displayed in an area between the first portion and the second portion.

* * * * *